US009457390B2

(12) United States Patent
Tomizawa et al.

(10) Patent No.: US 9,457,390 B2
(45) Date of Patent: Oct. 4, 2016

(54) METHOD AND APPARATUS FOR MANUFACTURING A BENT MEMBER

(75) Inventors: Atsushi Tomizawa, Minou (JP); Naoaki Shimada, Osaka (JP); Shinjiro Kuwayama, Osaka (JP); Saburo Inoue, Tama (JP); Manabu Okahisa, Kitakyushu (JP); Yusuke Kinoshita, Kitakyushu (JP); Takashi Suyama, Kitakyushu (JP)

(73) Assignees: NIPPON STEEL & SUMITOMO METAL CORPORATION, Tokyo (JP); SUMITOMO PIPE & TUBE CO., LTD., Ibaraki (JP); KABUSHIKI KAISHA YASKAWA DENKI, Fukuoka (JP)

( * ) Notice: Subject to any disclaimer, the term of this patent is extended or adjusted under 35 U.S.C. 154(b) by 1044 days.

(21) Appl. No.: 13/336,172

(22) Filed: Dec. 23, 2011

(65) Prior Publication Data

US 2012/0167651 A1    Jul. 5, 2012

Related U.S. Application Data

(63) Continuation of application No. PCT/JP2010/061918, filed on Jul. 14, 2010.

(30) Foreign Application Priority Data

Jul. 14, 2009 (JP) .................................. 2009-165626

(51) Int. Cl.
  *B21D 7/16* (2006.01)
  *B21D 7/04* (2006.01)

(52) U.S. Cl.
  CPC .................. *B21D 7/162* (2013.01); *B21D 7/04* (2013.01); *B21D 7/16* (2013.01); *B21D 7/165* (2013.01)

(58) Field of Classification Search
  CPC ............ B21D 7/02; B21D 7/03; B21D 7/04; B21D 7/08; B21D 7/16; B21D 7/162; B21D 7/165; B21D 9/18

USPC .......... 72/128, 149, 154, 177, 342.1, 342.5, 72/342.6, 369

See application file for complete search history.

(56) References Cited

U.S. PATENT DOCUMENTS 4,061,005 A * 12/1977 Kawanami et al. ........... 72/21.4
7,021,107 B2 * 4/2006 Saegusa .......................... 72/307
(Continued)

FOREIGN PATENT DOCUMENTS

DE    3619643 A1 * 1/1987 ............... B21D 7/16
EP    1 219 363    7/2002
(Continued)

OTHER PUBLICATIONS

Jidosha Gijutsu, Journal of Society of Automotive Engineers of Japan, vol. 57, No. 6, 2003, pp. 23-28.

*Primary Examiner* — Edward Tolan
(74) *Attorney, Agent, or Firm* — Clark & Brody

(57) ABSTRACT

A bending apparatus has (a) a first manipulator which feeds a hollow metal blank of closed cross section in its lengthwise direction, (b) a second manipulator which supports a first support means disposed at a first position and a metal blank while feeding it, a heating means disposed at a second position downstream of the first position in the blank feed direction for heating all or part of the circumference of the blank, and a cooling means disposed at a third position downstream of the second position for cooling a portion of the heated blank, and (c) a third manipulator which constitutes a second support means disposed at a fourth position downstream of the third position in the feed direction of the blank and which moves two-dimensionally or three-dimensionally while supporting at least one location of the metal blank to bend the metal blank into a desired shape.

18 Claims, 14 Drawing Sheets

(56) References Cited

U.S. PATENT DOCUMENTS

| | | | |
|---|---|---|---|
| 8,511,135 B2* | 8/2013 | Kuwayama et al. | 72/422 |
| 8,528,380 B2* | 9/2013 | Kuwayama et al. | 72/369 |
| 8,567,225 B2* | 10/2013 | Okada et al. | 72/369 |
| 8,863,565 B2* | 10/2014 | Tomizawa et al. | 72/342.6 |
| 2008/0066517 A1* | 3/2008 | Tomizawa et al. | 72/364 |
| 2012/0079866 A1* | 4/2012 | Kuwayama et al. | 72/342.6 |

FOREIGN PATENT DOCUMENTS

| | | |
|---|---|---|
| JP | 50-59263 | 5/1975 |
| JP | 53-76158 | 7/1978 |
| JP | 63-043727 | 2/1988 |
| JP | 2816000 | 8/1998 |
| JP | 2000-158048 | 6/2000 |
| JP | 3195083 | 6/2001 |
| JP | 2007-83304 | 4/2007 |
| JP | 2008-272883 | 11/2008 |
| JP | 2009-50903 | 3/2009 |
| JP | 2009-148780 | 7/2009 |
| WO | 2006/049165 | 5/2006 |
| WO | 2008/123505 | 10/2008 |

* cited by examiner (a)         (b)

(c)

(a)

(b)

(c)

Path of exit side robot

METHOD AND APPARATUS FOR MANUFACTURING A BENT MEMBER

TECHNICAL FIELD

This invention relates to a method and apparatus for manufacturing a bent member. Specifically, the present invention relates to a method and apparatus for manufacturing a bent member by carrying out two-dimensional or three-dimensional bending of a long metal blank having a closed cross section.

BACKGROUND ART

Metal strength members, reinforcing members, or structural members which are used in automobiles and various types of equipment and which have a bent shape (referred to below as bent members) need to have a high strength, a low weight, and a small size. In the past, bent members have been manufactured by, for example, welding of press-formed members, punching of plates, or forging. The extent to which a bent member achieved by these manufacturing methods can be made lighter or smaller in size has reached a limit.

In recent years, the manufacture of bent members by the so-called tube hydroforming technique has been actively studied (see Non-Patent Document 1, for example). On page 28 of Non-Patent Document 1, it is stated that there are various problems associated with the tube hydroforming technique such as developing materials to be processed or increasing the degree of freedom of the shape which can be formed whereby further technical development of the tube hydroforming technique is necessary.

Besides, there have been many disclosures of techniques for manufacturing a bent member by bending a straight metal tube.

Patent Document 1 discloses a technique for bending a metal tube while subjecting it to heat treatment. Patent Document 2 discloses a technique for manufacturing a curved spiral bar or section having a shaped cross section. Patent Document 3 discloses a bending apparatus which utilizes high frequency induction heating. Patent Document 4 discloses a bending apparatus for a metal member.

In Patent Document 5, the present applicant disclosed a bending method and a bending apparatus for a metal blank. FIG. 19 is an explanatory view showing an outline of this bending apparatus 0.

As shown in FIG. 19, a steel tube 1 is supported by a support means 2 so that the steel tube 1 can move in its axial direction. A feed device 3 has a ball screw, for example, as a component. The feed device 3 feeds the steel tube 1 from an upstream side to a downstream side.

An induction heating coil 5 is disposed downstream of the support means 2. The induction heating coil 5 rapidly heats a portion of the steel tube 1 by induction heating to a temperature range in which quench hardening is possible. A water cooling device 6 is disposed downstream of the high frequency heating coil 5. The cooling device 6 rapidly cools the steel tube 1. As a result, the temperature of the steel tube 1 becomes a temperature at which quench hardening is possible only between the induction heating coil 5 and the water cooling device 6 (below, a portion of the steel tube 1 which is at a temperature at which quench hardening is possible will be referred to as a high-temperature area).

A movable roller die 4 is movably disposed on the downstream side of the water cooling device 4. The movable roller die 4 has at least one set of roll pairs 4a. The roll pairs 4a can support the steel tube 1 while feeding it. The movable roller die 4 moves two-dimensionally or three-dimensionally. As a result of the movement, a bending moment is imparted to the high-temperature area of the steel tube 1 so that the steel tube 1 undergoes bending. In this manner, a bent member 8 is manufactured with a high operating efficiency while maintaining sufficient bending accuracy.

PRIOR ART DOCUMENTS

Patent Documents

Patent Document 1—JP 50-59263 A
Patent Document 2—JP 2816000 B
Patent Document 3—JP 2000-158048 A
Patent Document 4—JP 3195083 B
Patent Document 5—JP 2007-83304 A

Non-Patent Documents

Non-Patent Document 1—Jidosha Gijutsu (Journal of Society of Automotive Engineers of Japan), Vol. 57, No. 6, 2003, pp. 23-28

DISCLOSURE OF INVENTION

Problem which the Invention is to Solve

In Japanese Patent Application No. 2008-276494, the present applicant disclosed an improved manufacturing apparatus for carrying out bending.

A long metal blank having a closed cross-sectional shape is fed in its lengthwise direction and is supported at a first position. The metal blank is locally heated at a second position downstream of the first position in the feed direction of the metal blank. The portion of the metal blank which was heated at the second position is cooled at a third position downstream of the second position in the feed direction. As a result, a high-temperature area is formed in the portion of the metal blank between the second position and the third position.

The metal blank is gripped by a gripping means in a region downstream of the third position in the feed direction of the metal blank. The gripping means is disposed such that it can be inserted inside the front end of the metal blank or can contact the outer surface of the front end of the metal blank.

The position of the gripping means is varied two-dimensionally or three-dimensionally in a workspace including a space upstream of the third position in the feed direction. As a result, a bending moment is imparted to the high-temperature area to carry out bending.

FIGS. 20(a)-20(e) are explanatory views showing the state at various points in time during the manufacture of a bent member 13 using this manufacturing apparatus.

The feed direction of a metal blank 9 being processed is the axial direction of the metal blank 9, not only in this manufacturing apparatus but in the techniques disclosed in Patent Documents 1-5, and it does not vary during bending. This causes the installation space of an apparatus for carrying out bending to become large, and the bending apparatus also becomes large. The reason why will be explained in detail below.

As shown in FIGS. 20(a)-20(d), a feed device 10 feeds the metal blank 9 in its axial direction. A heating and cooling device 11 rapidly heats and cools the metal blank 9. A gripping means 12 is supported by an industrial robot 14 which is an articulated robot, for example. As shown by the dashed line arrow, as the gripping means 12 moves two-dimensionally or three-dimensionally, a bending moment is imparted to the high-temperature area of the metal blank 9. In this manner, a bent member 13 is manufactured.

Since the gripping means 12 unavoidably moves over a wide range in order to manufacture the bent member 13, the length of the manipulator of the industrial robot 14 which supports the gripping means 12 (referred to below as the arm length) must be long. Therefore, the bending apparatus becomes large in size.

In addition, the gripping means 12 needs to move over a wide range of speeds. To this end, the manipulator of the industrial robot 14 moves over a wide speed range from a high speed to a low speed. As a result, variations in the speed of movement of the manipulator of the industrial robot 14 become large, and vibrations easily develop at the time of operation of the manipulator of the industrial robot 14, leading to a decrease in the dimensional accuracy of the bent member 13. The vibrations of the manipulator of the industrial robot 14 can be reduced by setting the operating speed to a low value, but doing so decreases the productivity of the manufacturing apparatus.

Furthermore, in this manufacturing apparatus, it is necessary to provide a large installation space for a supply device for the metal blank 9.

A first object of the present invention is (a) reducing the size and equipment costs of a bending apparatus by reducing the range of movement of a gripping means in the bending apparatus proposed in Japanese Patent Application No. 2008-276494, for example, and (b) reducing variations in the operating speed of the arm and vibrations of the arm during operation of an industrial robot which supports the gripping means by reducing the speed of movement of the gripping means.

A second object of the present invention is to provide a method and an apparatus for manufacturing a bent member capable of manufacturing a bent member having excellent dimensional accuracy with high productivity and at a low cost while achieving a decrease in the overall size of the apparatus.

Means for Solving the Problem

The present invention is a manufacturing method for a bent member characterized by carrying out bending of a hollow metal blank having a closed cross section with satisfying the following conditions 1-6:

Condition 1: a first manipulator grips a first portion of the metal blank located on the side of a first end thereof;

Condition 2: a second manipulator supports a high-temperature area forming mechanism which heats a region of the metal blank which is located between the first portion and a second portion located on the side of a second end of the metal blank and then performs cooling, thereby forming a high-temperature area in a portion of the region;

Condition 3: a third manipulator grips the second portion of the metal blank;

Condition 4: the first manipulator intermittently moves in the axial direction of the first portion of the metal blank and/or moves two-dimensionally or three-dimensionally such that a bending moment can be imparted to the high-temperature area;

Condition 5: the third manipulator intermittently moves in the axial direction of the second portion of the metal blank and/or moves two-dimensionally or three-dimensionally such that a bending moment can be imparted to the high-temperature area; and Condition 6: by satisfying Conditions 4 and 5, a bending moment is imparted to the high-temperature area while producing relative movement of the high-temperature area forming mechanism with respect to the metal blank in its axial direction.

In the present invention, the first manipulator preferably operates so as to produce a twisting movement of the metal blank around its axis and/or the third manipulator preferably operates so as to produce a twisting movement of the metal blank around its axis. The present invention encompasses an embodiment in which a hollow, straight metal blank having a closed cross section undergoes twisting about its axis.

In the present invention, the first manipulator preferably continuously moves in the axial direction of the first portion of the metal blank, the third manipulator preferably does not move in the axial direction of the second portion of the metal blank, and the high-temperature area forming mechanism preferably changes its angle of installation in accordance with changes in the direction of displacement of the first portion. In this case, the installation position of the high-temperature area forming mechanism is more preferably moved to a position closer to the first portion.

In the present invention, when the third manipulator moves two-dimensionally or three-dimensionally, and/or when the first manipulator moves two-dimensionally and three-dimensionally, the second manipulator preferably moves the high-temperature area forming mechanism in the axial direction of the metal blank.

In the present invention, the high-temperature area forming mechanism preferably has a heating means for heating the metal blank and a cooling means for forming a high-temperature area by cooling the metal blank which was heated by this heating means.

In the present invention, it is preferred that the first manipulator be disposed at a first position, the heating means be disposed at a second position downstream of the first position in the axial direction of the metal blank, the cooling means be disposed at a third position downstream of the second position in the axial direction of the metal blank, and the third manipulator be disposed at a fourth position downstream of the third position in the axial direction of the metal blank.

From another standpoint, the present invention is an apparatus for manufacturing a bent member, the apparatus comprising a first manipulator, a second manipulator, and a third manipulator as described below and being capable of manufacturing a bent member by performing bending on a hollow metal blank having a closed cross section so as to satisfy the following Conditions 1 to 3:

the first manipulator: gripping a first portion of a metal blank located on the side of a first end thereof;

the second manipulator: supporting a high-temperature area forming mechanism which heats a region of the metal blank which is located between the first portion and a second portion located on the side of a second end of the metal blank and then performs cooling, thereby forming a high-temperature area in a portion of the region;

the third manipulator: gripping the second portion of the metal blank;

Condition 1: the first manipulator intermittently moves in the axial direction of the first portion of the metal blank and/or moves two-dimensionally or three-dimensionally such that a bending moment can be imparted to the high-temperature area;

Condition 2: the third manipulator intermittently moves in the axial direction of the second portion of the metal blank and/or moves two-dimensionally or three-dimensionally such that a bending moment can be imparted to the high-temperature area; and Condition 3: by satisfying Conditions 1 and 2, a bending moment is imparted to the high-temperature area while producing relative movement of the high-temperature area forming mechanism with respect to the metal blank in its axial direction.

The present invention is also an apparatus for manufacturing a bent member from a metal blank comprising a feed means which is disposed at a first position so as to be able to move two-dimensionally or three-dimensionally and which can feed a hollow metal blank having a closed cross section while changing the feed direction, a heating means which is positioned at a second position downstream of the first position in the feed direction of the metal blank and which heats all or a portion of the circumference of the metal blank being fed, a cooling means which is disposed at a third position downstream of the second position in the feed direction of the metal blank and which cools the portion of the metal blank being fed which was heated by the heating means, and a bending means which is disposed at a fourth position downstream of the third position in the feed direction of the metal blank so as to be able to move two-dimensionally or three-dimensionally and which together with the feed means imparts a bending moment to the heated portion of the metal blank by gripping at least one location of the metal blank being fed and thereby bends the metal blank into a desired shape, characterized in that the heating means and the cooling means have the function that their angles of installation can be changed in accordance with changes in the feed direction of the metal blank by the feed means.

In the present invention, the heating means and the cooling means preferably have the function that their installation positions can be changed to positions closer to the position of the feed means.

In the present invention, it is preferred that the feed means be supported by a first manipulator, the heating means and the cooling means be supported by a second manipulator, and the bending means be supported by a third manipulator.

In this case, (A) the first manipulator is preferably a manipulator of a vertically articulated first industrial robot, the second manipulator is preferably a manipulator of a vertically articulated second industrial robot, and the third manipulator is preferably a manipulator of a vertically articulated third industrial robot, or (B) the first manipulator and the third manipulator are preferably manipulators of a dual-arm first industrial robot as disclosed in JP 2008-272883 A, for example, and the second manipulator is preferably a manipulator of a vertically articulated second industrial robot.

In the present invention, (C) the third manipulator preferably supports a metal blank which underwent bending in order to suppress a decrease in the dimensional accuracy of the metal blank or (D) a fourth manipulator is preferably provided to support a metal blank which underwent bending and thereby suppress a decrease in the dimensional accuracy of the metal blank. The fourth manipulator is preferably a manipulator of a vertically articulated fourth industrial robot.

In the present invention, the vertically articulated industrial robots preferably have at least five axes.

In the present invention, a support means which guides the metal blank to the heating means is preferably provided on the entrance side of the heating means.

In the present invention, the feed direction on the entrance side of the metal blank which is being processed (the supply side of the blank) is not limited to the axial direction of the metal blank but can be varied. Namely, the angle of incidence of the metal blank is variable, and the angles of installation of the heating means and the cooling means are variable in accordance with changes in the angle of incidence of the metal blank. As a result, the range of movement of the bending means which is constituted by an industrial robot, for example, is reduced to a narrow range.

Therefore, an industrial robot having a shorter arm length can be selected, whereby the bending apparatus can be made compact and equipment costs can be reduced. Furthermore, the operating speed of the industrial robot is reduced, and changes in the operating speed and vibrations generated during operation are both reduced. As a result, a bent member having an improved dimensional accuracy can be manufactured with high productivity and at a low cost.

Effects of the Invention

According to the present invention, by reducing as much as possible the range of movement of the gripping means in the invention proposed in Japanese Patent Application No. 2008-276494, a bending apparatus can be made compact and its equipment costs can be reduced while decreasing the installation space of the apparatus as a whole, and by reducing the speed of movement of the gripping means as much as possible, variations in the operating speed and vibrations generated during operation can be reduced. As a result, according to the present invention, a bent member having an improved dimensional accuracy can be manufactured with high productivity while restraining an increase in equipment costs as much as possible.

Accordingly, the present invention makes it possible to provide a strength member, a reinforcing member, or a structural member for an automobile, for example, which is made of metal and has a bent shape with an improved dimensional accuracy at a low cost.

Figure 1:
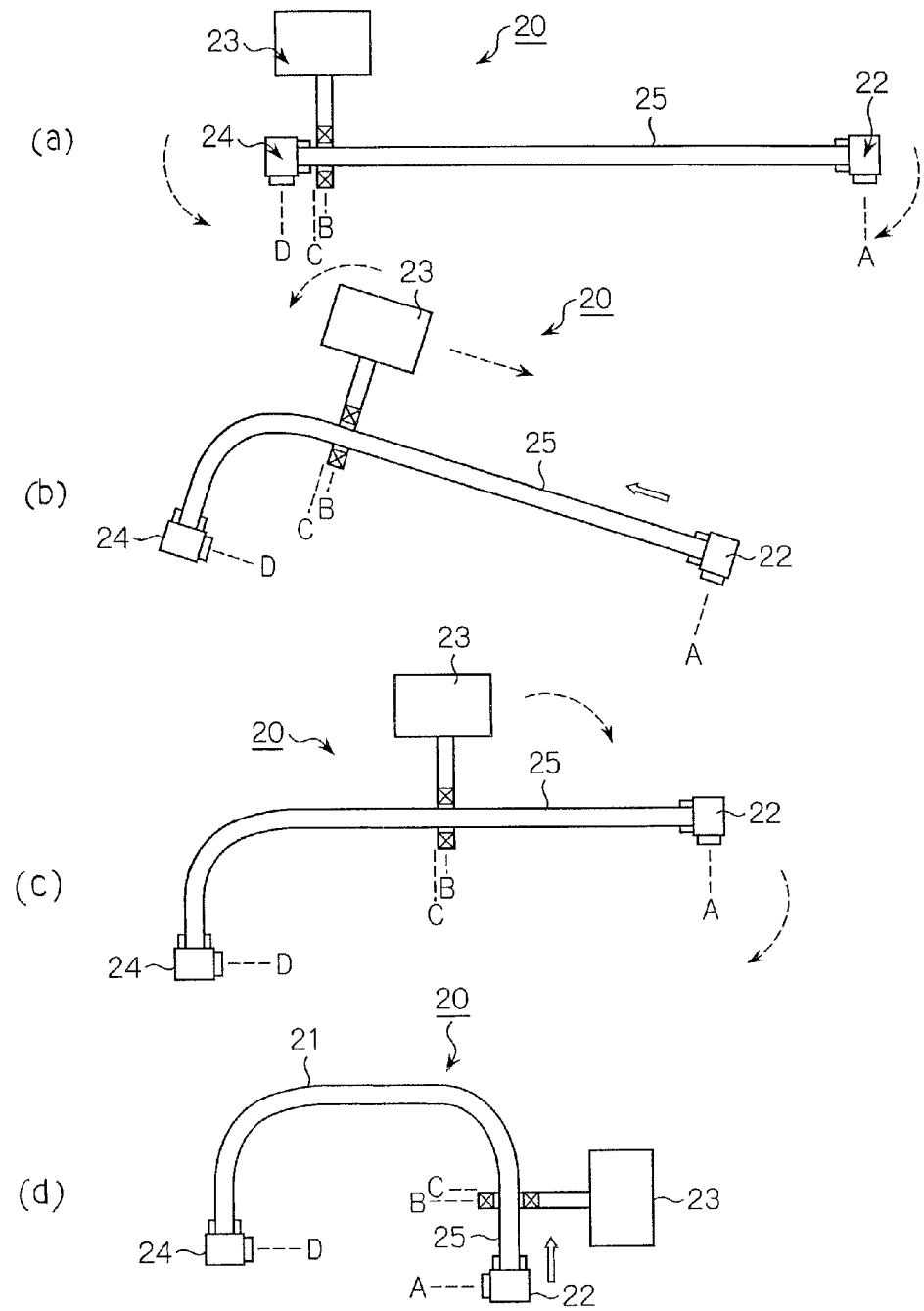
FIGS. 1(a)-1(d) are explanatory views showing the state at various points in time during the manufacture of a bent member by a manufacturing apparatus according to the present invention.

EXPLANATION OF SYMBOLS 0 bending apparatus
1 steel tube
2 support means
3 feed device
4 movable roller die
4a roll pair
5 high-frequency heating coil
6 water cooling device
8 bent member
9 metal blank
10 feed device
11 heating and cooling device
12 gripping means
13 bent member
14 industrial robot
20 manufacturing apparatus according to the present invention
21 bent member
22 feed means
23 high-temperature area forming mechanism
24 bending means
25 steel tube
26 dual arm industrial robot
27 first manipulator
28 third manipulator
29 industrial robot
29a second manipulator Best Mode for Carrying out the Invention In the following explanation, an example will be given of the case in which "a hollow metal member having a closed cross section" according to the present invention is a steel tube. The present invention can be applied in the same manner to a hollow metal member having a closed cross section other than a steel tube.

FIGS. 1(a)-1(d) are explanatory views showing the state at various points in time during the manufacture of a bent member 21 by a manufacturing apparatus 20 according to the present invention. The manufacturing apparatus 20 has a feed means 22, a high-temperature area forming mechanism 23 which heats and cools a steel tube 25 to form a high-temperature area, and a bending means 24.

[Feed Means 22]

The feed means 22 is disposed at a first position A so as to be able to move two-dimensionally or three-dimensionally. Feed means 22 feeds the steel tube 25 while changing its feed direction. The feed means 22 cooperates with the below-described bending means 24 so as tp bend a steel tube 25 into a desired shape by imparting a bending moment to a high-temperature area of the steel tube 25.

The feed means 22 is supported by a first manipulator 27. As a result, a reduction in the space of the feed means 22 and a reduction in the space of a material supply apparatus are achieved. The first manipulator 27 is preferably a vertically articulated manipulator or a dual arm manipulator as disclosed by JP 2008-272883 A, for example.

Figure 2:
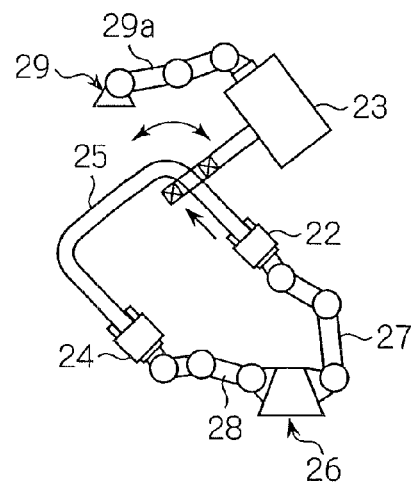
FIG. 2 is an explanatory view showing the state in which a feed means and a bending means are supported by the two manipulators of a dual arm industrial robot and a heating and cooling means is supported by an articulated industrial robot.

FIG. 2 is an explanatory view showing the state in which the feed means 22 is supported by a first manipulator 27 of the two vertically articulated manipulators of a dual arm industrial robot 26, the bending means 24 is supported by a third manipulator 28 of the robot, and the high-temperature area forming mechanism 23 is supported by a second manipulator 29a of a six-axis vertically articulated industrial robot 29.

The dual arm industrial robot 26 shown in FIG. 2 has a seven-axis first manipulator 27 and a seven-axis third manipulator 28. The first manipulator 27 and the third manipulator 28 are installed on a base (not shown) which has a pivoting axis which can pivot about an axis perpendicular to a fixed surface. Overall, the industrial robot 26 has a degree of freedom consisting of 15 axes.

The industrial robot 26 operates the feed means 22 and the bending means 24 supported by manipulators 27 and 28, respectively, with six degrees of freedom consisting of three axes of translation and three axes of rotation. As a result, the industrial robot 26 can process a bent member having a complicated three-dimensional shape. Each of the manipulators 27 and 28 has seven axes, and in addition to the six degrees of freedom described above, the manipulators 27 and 28 can be folded into a compact shape. As a result, the industrial robot 26 can supply a material to be processed in the form of a steel tube 25 in a compact space.

The vertically articulated manipulators have first through sixth axes. The first axis allows an upper arm to swing in a horizontal plane. The second axis allows the upper arm to swing forwards and backwards. The third axis allows a forearm to swing up and down. A fourth axis allows the forearm to rotate. The fifth axis allows a wrist to swing up and down. The sixth axis allows the wrist to rotate. If necessary, in addition to the first through sixth axes, the manipulator may have a seventh axis which allows the upper arm to pivot. The movement of the first through seventh axes is driven by AC servomotors.

The vertically articulated industrial robots need not have six or seven axes and may have five axes. Namely, the vertically articulated industrial robots may have any number of axes which can carry out the necessary processing operation.

Suitable end effectors for gripping the feed means 22, the high-temperature area forming mechanism 23, and the bending means 24 are provided at the tips of the wrists of the industrial robots. The end effectors will be described below.

In this manner, the first manipulator 27 grips a first portion located on the side of a first end of the steel tube 25.

[High-Temperature Area Forming Mechanism 23]

The high-temperature area forming mechanism 23 is disposed at a second position B downstream of the first position A in the feed direction of the steel tube 25. The high-temperature area forming mechanism 23 has a heating means and a cooling means. The heating means heats all or a portion of the circumference of the steel tube 25. The cooling means is disposed at a third position C downstream of the second position B in the feed direction of the steel tube 25. The cooling means cools the portion of the steel tube 25 which was heated by the heating means.

In order to simplify the explanation, the case will be described in which the high-temperature area forming mechanism 23 comprises a single member. However, the heating means and the cooling means can of course be separate devices.

The heating means heats all or a portion the circumference of the steel tube 25 being fed. A high frequency heating apparatus having a heating coil disposed around and spaced from the steel tube 25 is used as the heating means. A high frequency heating coil is well known to and conventionally used by those skilled in the art, so a further explanation of the heating means will be omitted.

The cooling means cools the portion of the steel tube 25 which was heated by the heating means. A water cooling device having a cooling water spraying nozzle spaced from the outer surface of the steel tube 25 is used as the cooling means. This type of cooling water spraying nozzle is well known to and conventionally used by those skilled in the art, so a further explanation of the cooling means will be omitted.

The high-temperature area forming mechanism 23 is supported by a suitable moving mechanism by means of which the angle of installation of the high-temperature area heating mechanism 23 can be varied in accordance with changes in the feed direction of the steel tube 25 by the feed means 22. As a result, the manufacturing apparatus 20 can manufacture a bent member 21 while varying the installation angle of the high-temperature area forming mechanism 23 in accordance with changes in the feed direction of the steel tube 25 by the feed means 22.

In addition, a bent member 21 can be manufactured while varying the position of the high-temperature area forming mechanism 23 to the vicinity of the feed means 22. Namely, the installation position of the high-temperature area forming mechanism 23 can be changed to a position closer to the feed means 22. As a result, a reduction in the space of the manufacturing apparatus 20 can be achieved. Although it depends upon the shape of the product, moving the high-temperature area forming mechanism 23 in the axial direction can reduce the installation space of the manufacturing apparatus 20 to approximately one-half to two-thirds.

The high-temperature area forming mechanism 23 is supported by the second manipulator 29a, whereby the installation space of the manufacturing apparatus 20 is decreased. Specifically, the second manipulator 29a is preferably a manipulator of a vertically articulated second industrial robot which preferably has at least five axes.

In this manner, the second manipulator 29a supports the high-temperature area forming mechanism 23. The high-temperature area forming mechanism 23 heats a region located between the first portion of the steel tube 25 and a second portion located on the side of a second end of the steel tube 25 and then performs cooling to form a high-temperature area in a portion of this region.

[Bending Means 24]

The bending means 24 is disposed at a fourth position D downstream of the third position C in the feed direction of the steel tube 25. The bending means 24 is disposed so as to be able to move two-dimensionally or three-dimensionally. The bending means 24 grips the steel tube 25 being fed in at least one location. The bending means 24 imparts a bending moment to the high-temperature area of the steel tube 25 by cooperation with the feed means 22 and bends the steel tube 25 into a desired shape.

In order to increase space efficiency, the bending means 24 is preferably constituted by a third manipulator 28. Specifically the third manipulator 28 is preferably a manipulator of a vertically articulated third industrial robot or the other manipulator of the above-described dual arm first industrial robot.

The third manipulator 28 may have a structure such that it supports a steel tube 25 which has undergone bending, whereby a decrease in the dimensional accuracy of the steel tube 25 is reduced. Alternatively, there may be a fourth manipulator which suppresses a decrease in the dimensional accuracy of the steel tube 25 by supporting the steel tube 25 which has undergone bending. This fourth manipulator is preferably a manipulator of a vertically articulated fourth industrial robot which preferably has at least five axes.

In this manner, the third manipulator 28 grips the second portion located on the side of the second end of the steel tube 25.

Below, the end effector will be explained.

Figure 3:
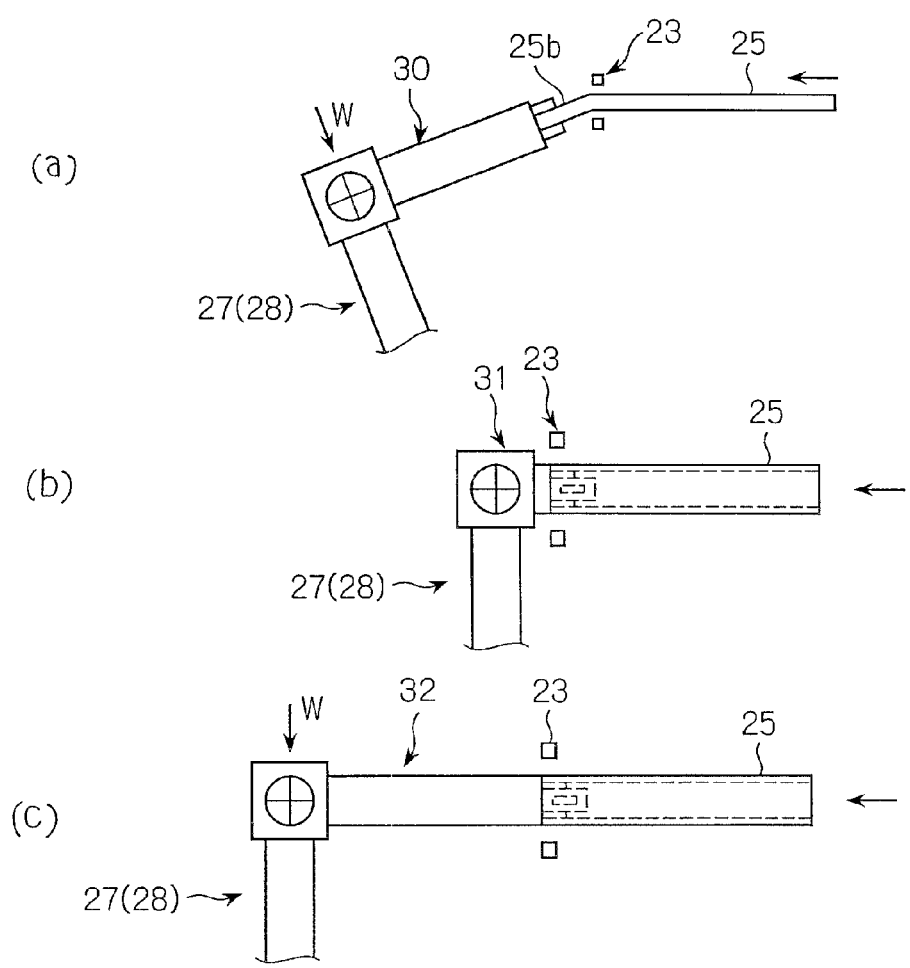
FIG. 3(a) is an explanatory view schematically showing a long chuck for use as an end effector for the case in which a first portion of a steel tube located on the side of a first end thereof is gripped by a first manipulator or for use as an end effector for the case in which a second portion of the steel tube located on the side of a second end thereof is gripped by a third manipulator.
FIG. 3(b) is an explanatory view schematically showing a short chuck for use as an end effector in this situation.
FIG. 3(c) is an explanatory view schematically showing a long chuck for use as an end effector in this situation.

FIG. 3(*a*) is an explanatory view schematically showing an elongated chuck 30, FIG. 3(*b*) is an explanatory view schematically showing a short chuck 31, and FIG. 3(*c*) is an explanatory view schematically showing an elongated chuck 32. Chucks 30-32 are end effectors for the case in which a first portion located on the side of the first end of the steel tube 25 is gripped by the first manipulator 27 or a second portion located on the side of the second end of the steel tube 25 is gripped by the third manipulator 28.

Chucks 30-32 each have a tubular body for gripping the first or second portion of the steel tube 25.

Chuck 30 is disposed on the outside of the steel tube 25, and it grips an end of the steel tube 25 by contacting the outer surface 25*b* of the steel tube 25. Chuck 30 has a structure such that its inner diameter can be increased by a suitable mechanism like that described below.

Chucks 31 and 32 can each be inserted into the steel tube 25. Chucks 31 and 32 grip an end of the steel tube 25 by contacting the inner surface of the steel tube 25. Chucks 31 and 32 have a structure such that their outer diameter can be expanded by a suitable mechanism like that described below.

These chucks 30-32 properly hold an end of the steel tube 25 which is being fed in the axial direction, whereby the bending apparatus 20 can carry out bending of the steel tube 25 with adequate working accuracy.

Chucks 30-32 each have a tube end sealing mechanism which contacts a sealing surface formed on the end of the tube or an inner surface sealing mechanism which contacts a sealing surface formed on the inner surface of the tube. As a result, chucks 30-32 seal the steel tube 25 by directly contacting the end portion or the inner surface of the steel tube 25. Because chucks 30-32 prevent water from penetrating into the steel tube 25, the temperature of the steel tube 25 is properly increased by the high-temperature area forming mechanism 23. As a result, the manufacturing apparatus 20 can carry out bending of the steel tube 25 with sufficient working accuracy.

Chuck 30 is constituted by an elongated tubular member. Therefore, chuck 30 can suppress a bending load W to a low level and can prevent interference between the first manipulator 27 or the third manipulator 28 and equipment installed in its periphery even when bending starts in the vicinity of the end portion of the steel tube 25.

Chuck 31 is constituted by a short tubular member. Quench hardening of the steel tube 25 can be carried out from the end portions of the steel tube 25, so the yield of the product is increased.

Chuck 32 is constituted by an elongated tubular member. Therefore, chuck 32 can suppress the bending load W to a small value, and it can prevent interference between the first manipulator 27 or the third manipulator 28 and equipment installed in its periphery even when bending starts in the vicinity of the end portion of the steel tube 25. Chuck 32 also enables quench hardening of the steel tube 25 to be carried out from its end portions, so the yield of the product can be increased.

Figure 4:
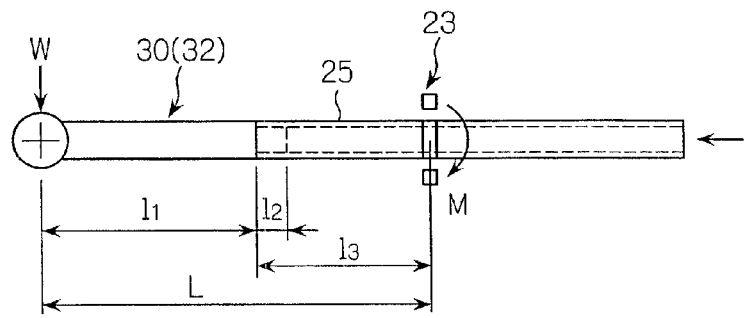
FIG. 4 is an explanatory view showing that a chuck can reduce a bending load.

FIG. 4 is an explanatory view showing how chucks 30 and 32 can suppress a bending load W to a low value.

Symbol W in FIG. 4 indicates a bending load. Symbol M indicates the moment necessary to bend the steel tube 25. Symbol $l_1$ indicates the chuck length. $l_2$ indicates the chuck overlap. Symbol $l_3$ indicates the distance from the end of the steel tube 25 to the starting point of bending.

The bending load is given by $W=M/L=M/(l_1+l_3)$. The longer is L, the smaller can W be. In order to increase the yield of a product, bending preferably starts from the vicinity of the end portion of the steel tube 25. Namely, $l_3$ is preferably made small. When there is a limit on the allowable load of the bending machine, $l_3$ can be shortened by increasing $l_1$.

By way of example, the bending moment necessary to carry out bending with a bending radius of 200 mm on a steel tube 25 having an outer diameter of 25 mm and a wall thickness of 1.0 mm is approximately 36 N-m.

When the allowable bending load is 500 N, when L=d, (with d being the outer diameter),W=1440 N>500N, and when L=2d, W=720 N>500 N. In either case, bending cannot be carried out. In contrast, when L=3d, W=480 N≤500N, and when L=4d, W=360 N≤500N, and when L=5d, W=288 N≤500 N, so in each case bending can be carried out.

For the above reasons, under the above conditions, it is desirable to satisfy the relationship L>3d.

Figure 5:
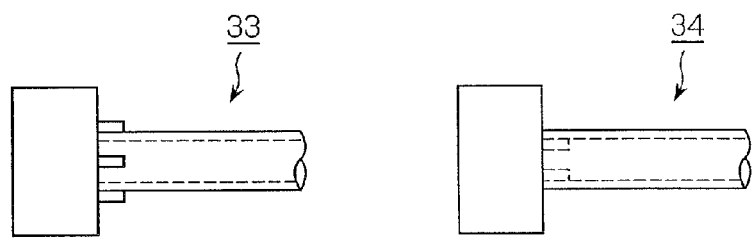
FIG. 5(a) is an explanatory view showing solely a chuck of a type which is disposed on the exterior of a steel tube and grips the end of the steel tube by contacting the outer surface of the steel tube.
FIG. 5(b) is an explanatory view showing solely a chuck of a type which is inserted into a steel tube and grips the end of the steel tube by contacting the inner surface of the steel tube.
FIG. 5(c) is an explanatory view showing various types of chucks.
Figure 5:
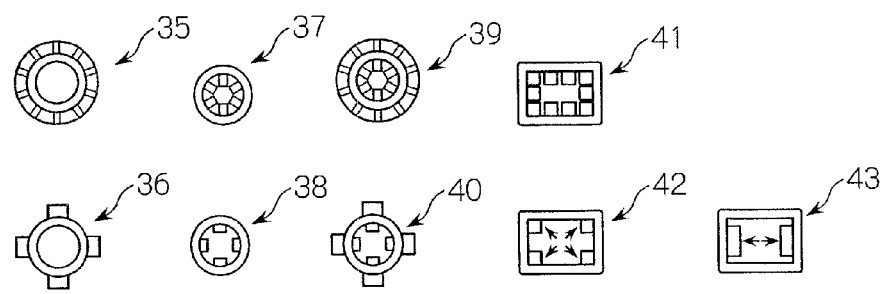

FIG. 5(*a*) is an explanatory view showing a chuck 33, and FIG. 5(*b*) is an explanatory view showing another chuck 34.

Chuck 33 is disposed on the outside of a steel tube 25 and grips the end portion of the steel tube by contacting the outer surface of the steel tube 25. Chuck 34 is inserted into a steel tube 25 and grips the end portion of the steel tube 25 by contacting the inner surface of the steel tube 25.

Chuck 34 is preferred to chuck 33 because it can easily center the steel tube 25 and it can easily obtain a gripping force by tension exerted by the steel tube 25 in the circumferential direction.

FIG. 5(*c*) is an explanatory view of various types of chucks 35-43.

Chucks 35 and 36 are disposed on the exterior of a steel tube 25 and contact the outer surface of the steel tube 25.

Chucks 37 and 38 are inserted into a steel tube 25 and contact the inner surface of the steel tube 25.

Chucks 39 and 40 are disposed on the exterior of a steel tube 25 and contact the outer surface of the steel tube 25 and are also inserted into the steel tube 25 and contact the inner surface of the steel tube 25.

Chucks 41-43 are all chucks for rectangular tubes. In order to obtain an adequate holding force with respect to a rectangular tube and grip a rectangular tube with certainty, chucks 41-43 are preferably inserted inside a rectangular tube and preferably contact both the inner surface and the inner corners of a steel tube.

Each of the above-described types of chucks is preferably disposed so that its central axis coincides with the central axis of the steel tube 25 in order to obtain a high working accuracy.

Figure 6:
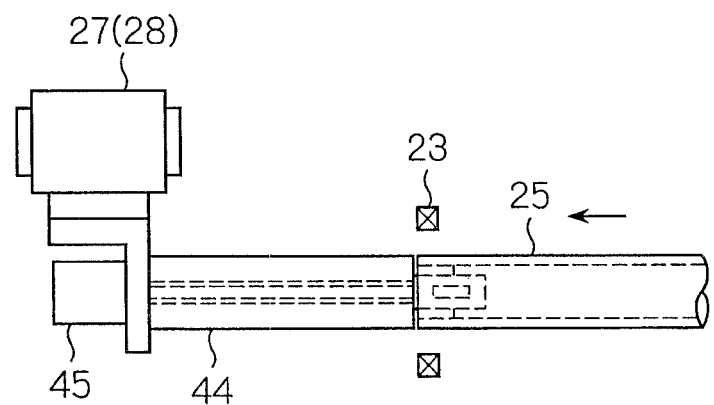
FIG. 6 is an explanatory view schematically showing an example of a chuck which can be used in the first manipulator or the third manipulator.

FIG. 6 is an explanatory view schematically showing an example of a chuck 44 used in the first manipulator 27 or the third manipulator 28. Symbol 45 in FIG. 6 indicates a cylinder.

FIG. 6 shows the case in which a steel tube 25 undergoes bending while being quench-hardened from the vicinity of its front end. In this case, chuck 44 is preferably an elongated chuck having an outer diameter which roughly coincides with the outer diameter of the steel tube 25.

Figure 7:
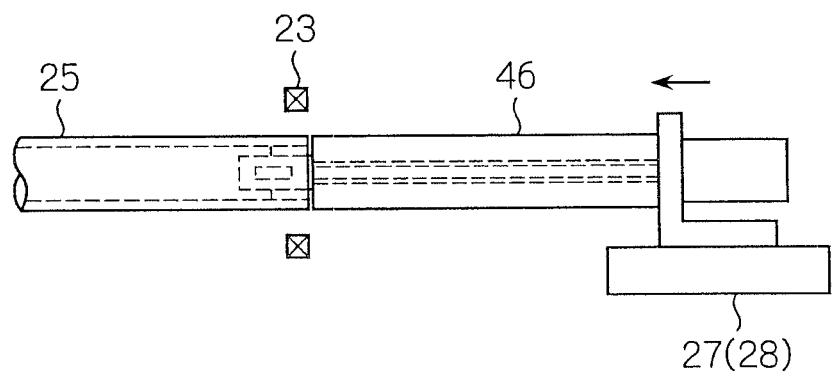
FIG. 7 is an explanatory view schematically showing an example of a chuck which can be used in the first manipulator or the third manipulator.

FIG. 7 is an explanatory view schematically showing an example of a chuck 46 used in the first manipulator 27 or the third manipulator 28.

FIG. 7 shows the case in which bending is carried out while performing quench hardening up to the vicinity of the rear end of the steel tube 25. Also in this case, chuck 46 is preferably an elongated chuck having an outer diameter which roughly coincides with the outer diameter of the steel tube 25.

Figure 8:
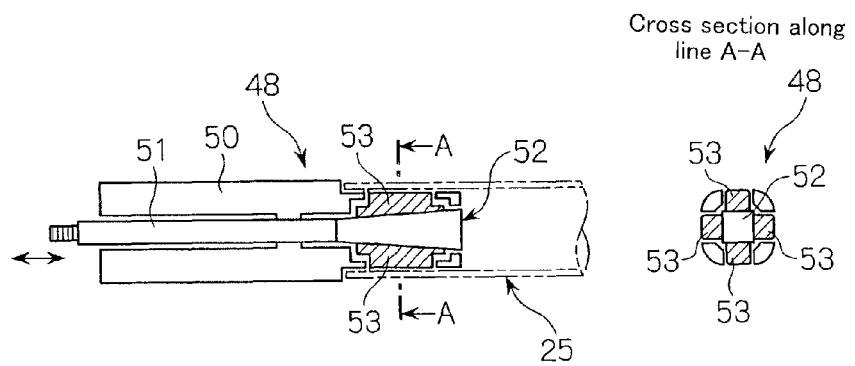
FIGS. 8(a)-8(c) are explanatory views schematically showing a mechanism for enlarging the outer dimensions of a chuck which is inserted into a steel tube and grips the end of the steel tube by contacting the inner surface of the steel tube.
Figure 8:
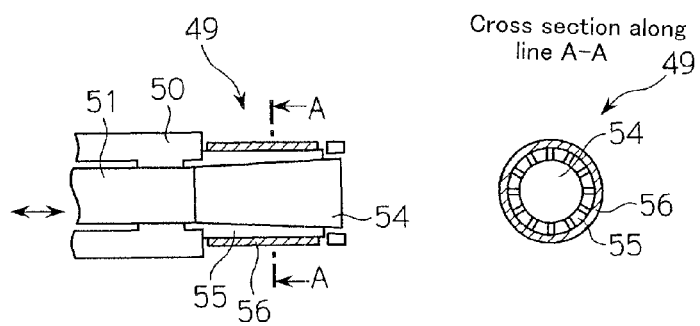
Figure 8:
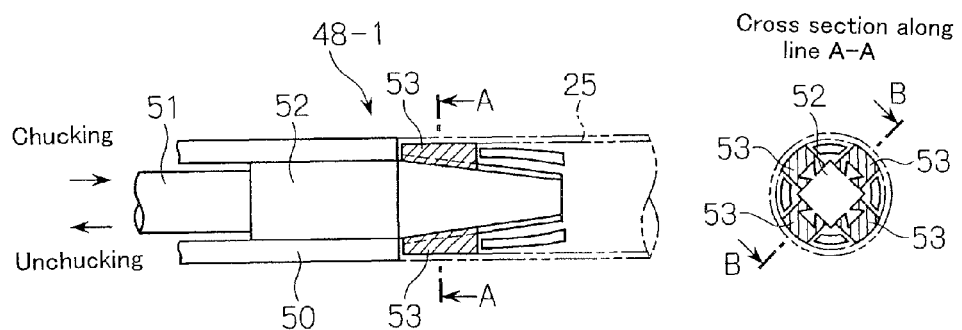

FIGS. 8(*a*)-8(*c*) are explanatory views schematically showing mechanisms for enlarging the outer dimensions of chucks 48, 49, and 48-1. Chucks 48, 49, and 48-1 are each inserted into the interior of a steel tube 25 and grip the end portion of the steel tube 25 by contacting the inner surface of the steel tube 25.

Chuck 48 has a shaft 51 and an operating bar 52 inside a cylindrical body 50.

The shaft 51 can be extended and retracted by a cylinder or the like (not shown). The operating bar 52 is disposed at the end of the shaft 51. Four chuck claws 53 are disposed on a sloping surface of the operating bar 52 and are positioned in the axial direction of the body 50. Moving the shaft 51 in the axial direction of the body 50 causes the chuck claws 53 to move in the radial direction, and as a result, the outer dimensions of chuck 48 are enlarged or reduced.

Chuck 49 has a shaft 51 and a conical bar 54 inside a cylindrical body 50. The shaft 51 can be extended or retracted by an unillustrated cylinder or the like. The conical bar 50 is disposed at the end of the shaft 51. A large number of segments 55 and an elastic claw 56 are disposed on the slope of the conical bar 54. When the shaft 51 moves in the axial direction of the body 50, the segments 55 move in the radial direction, and as a result, the outer dimensions of chuck 49 are enlarged or decreased.

In chuck 48-1, which is a variation of chuck 48, the operating bar 52 of chuck 48 is tapered at its end. The tapered operating bar 52 increases the cross-sectional area of the connection to the shaft 51, whereby the strength of the operating bar 52 is increased.

The chuck claws 53 preferably have dovetail grooves extending in the axial direction of the body 50 in order to carry out unclamping with certainty.

An example of the material of the chuck claws 53 and the operating bar 52 is an austenitic stainless steel or a tool steel. An austenitic stainless steel is non-magnetic, which makes it suitable because it is difficult for it to undergo inductive heating. However, its wear resistance (resistance to scratching) and seizing resistance are somewhat poor. On the other hand, a tool steel has excellent durability in a cold state. A tool steel is magnetic and is easily affected by induction heating, but if induction heating is not carried out up to the vicinity of the chuck claws 53, the tool steel experiences no problems in practical application. The body 50 is preferably made of a non-magnetic material such as an austenitic stainless steel.

Figure 9:
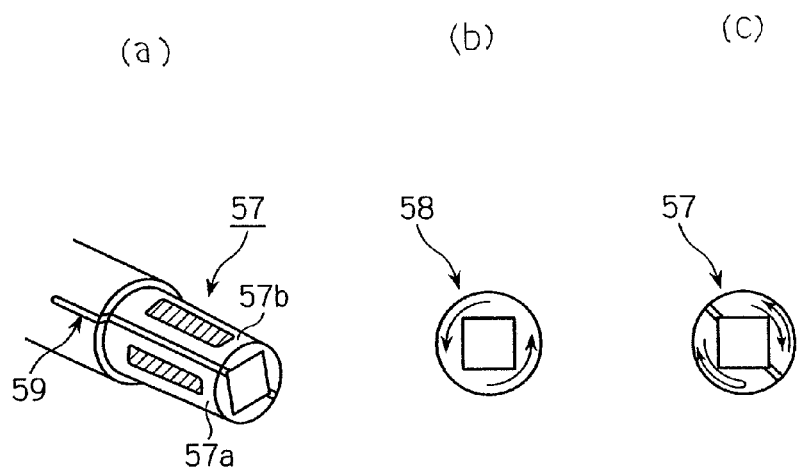
FIG. 9(a) is an explanatory view schematically showing an example of the structure of a chuck which is suitable for use in a manufacturing apparatus according to the present invention.
FIG. 9(b) shows a comparative example of a chuck.
FIG. 9(c) shows an example of a chuck of the present invention.

FIG. 9(a) is an explanatory view schematically showing an example of the structure of a chuck 57 suitable for use in a manufacturing apparatus 20 according to the present invention, FIG. 9(b) shows a chuck 58 of a comparative example, and FIG. 9(c) shows a chuck 57 of an example of the present invention.

As shown in FIG. 9(a) and FIG. 9(c), chuck 57 comprises component members 57a and 57b and an insulating members 59. Component members 57a and 57b are divided into plural parts (two in the illustrated example) in the circumferential direction. The insulating members 59 are disposed between adjoining component members 57a and 57b. The insulating members 59 are made of polytetrafluoroethylene or the like, for example.

As shown in FIG. 9(c), by disposing insulating members 59 between the plurality of components 57a and 57b of chuck 57, the current flowing through a component member 57a or 57b is canceled within each member. As a result, the induced currents caused by the high frequency heating coil 33 are prevented from flowing around the components 57a and 57b and heating chuck 58.

Figure 10:
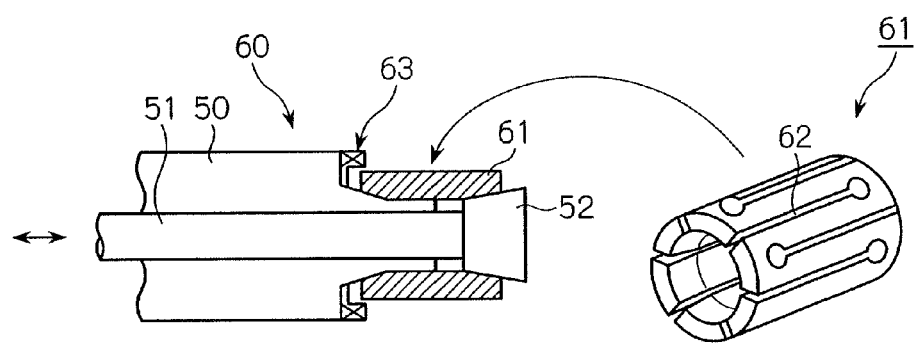
FIG. 10 is an explanatory view showing the structure of a chuck of the sleeve type having slits which is suitable for use in a bending apparatus according to the present invention.

FIG. 10 is an explanatory view showing the structure of a sleeve-type chuck 60 with slits which is suitable for use in a bending apparatus according to the present invention.

Chuck 60 has a shaft 51 and an operating lever 52 inside a cylindrical body 50. The shaft 51 can be extended and retracted by an unillustrated cylinder or the like. The operating bar 52 is disposed at the end of the shaft 51. A sleeve 61 having slits 62 and a sealing ring 63 are provided on the sloping surface of the operating bar 52 so as to be positioned in the axial direction of the body 50. The sleeve 61 having slits is elastically deformed by movement of the shaft 51 in the axial direction of the body 50 and expands or contracts in diameter. As a result, the outer dimensions of chuck 60 are increased or decreased.

Because the sleeve 61 has a plurality of slits 62, even when the sleeve is made of metal, it can elastically deform with a small force and its temperature is not readily increased by inductive heating.

The sleeve 61 can be adequately prevented from undergoing inductive heating simply by making the sleeve 61 from a non-magnetic material. The slits 62 are preferably provided when the strength of the sleeve 61 is adequately maintained.

Figure 11:
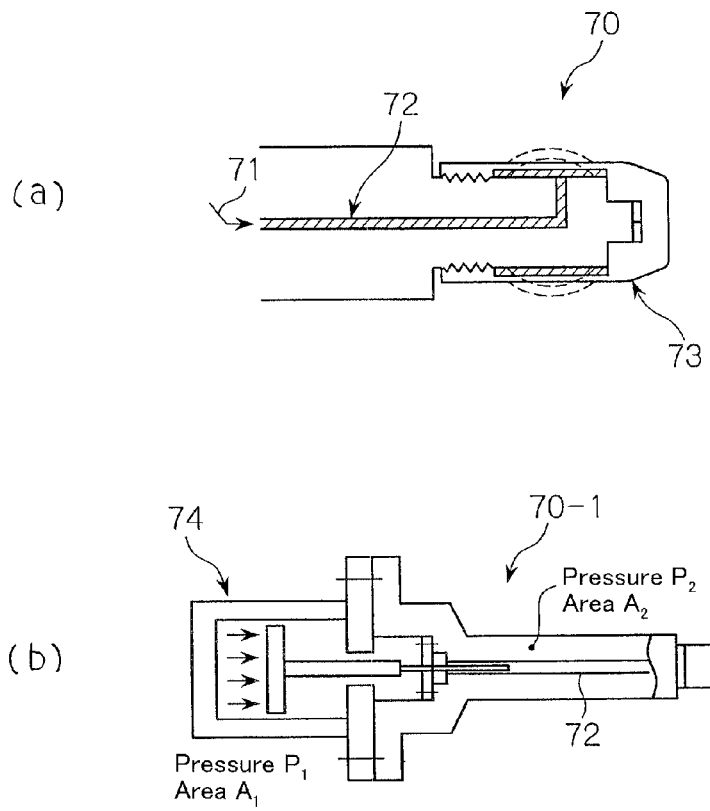
FIG. 11(a) is an explanatory view showing the structure of a chuck of a hydraulic sleeve type which is suitable for use in a bending apparatus according to the present invention.
FIG. 11(b) is an explanatory view showing a modification thereof.

FIG. 11(a) is an explanatory view showing the structure of a chuck 70 having a hydraulic sleeve which is suitable for use in a bending apparatus according to the present invention, and FIG. 11(b) is an explanatory view showing a variation 70-1 thereof.

A channel 72 for a high pressure fluid 71 which was produced using an unillustrated high pressure pump is formed inside chuck 70. A sleeve 73 which is formed from an elastic material is provided on the outer periphery of the tip of the body of chuck 70. The sleeve 73 is deformed so as to expand by passing the high pressure fluid 71 through the channel 72. Chuck 70 can decrease the outer diameter of the tip of the body, so it can be used as a chuck having a small inner diameter. The sleeve 73 is preferably made of a heat-resistant metal.

In chuck 70-1, a cylinder 74 produces a high pressure fluid 71. By making the cross-sectional area $A_1$ of the operating portion of the cylinder 74 larger than the cross-sectional area $A_2$ of a channel 72, the pressure $P_2$ in the channel 72 can be high even when the working pressure $P_1$ of cylinder 74 is low.

Figure 12:
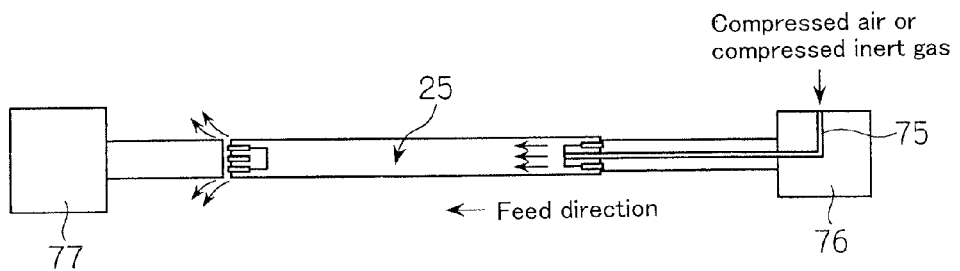
FIG. 12 is an explanatory view showing a mechanism for producing a positive pressure inside a steel tube.

FIG. 12 is an explanatory view of a mechanism for producing a positive pressure inside a steel tube 25.

If a sealing member at the end of the steel tube 25 is made of a flexible material such as rubber, the durability of the sealing member is sometimes inadequate. If the sealing member is made of metal, it is sometimes not possible to prevent penetration of water into the steel tube 25.

Therefore, a chuck 76 on the feed side is used as a mechanism for producing a positive pressure inside a steel tube 25. Chuck 76 on the feed side has a channel 75 for supplying compressed air or a compressed inert gas inside the operating bar. The compressed air or compressed inert gas is preferably supplied to the interior of the steel tube 25 through the channel 75 in chuck 76 on the feed side and is preferably discharged from the side on which an exit side chuck 77 is disposed. As a result, a positive pressure is maintained inside the steel tube 25, and cooling water from the cooling device 14 can be completely prevented from penetrating into the interior of the steel tube 25.

An inert gas such as nitrogen gas is preferably supplied to the interior of the steel tube 25 in order to prevent oxidation of the inside of the steel tube 25.

When the above-described chucks grip the inner surface of a blank being processed having a polygonal transverse cross section such as a rectangular transverse cross section, or when they grip the inner surface of a blank being processed having a special transverse cross-sectional shape having corners, if gripping is performed such that the chuck contacts each of the corners of the inner peripheral surface of the blank being processed, the gripping force can be increased, and the blank being processed can be centered with certainty.

The manufacturing apparatus 20 is constituted as described above. Next, manufacture of a bent member 21 by the manufacturing apparatus 20 will be explained.

As shown in FIG. 1(a), a steel tube 25 is locally rapidly heated and cooled by the high-temperature area forming mechanism 23 and is gripped by the bending means 24 while the steel tube 25 is fed by the feed means 22.

At this time, as shown by the dashed line arrow in FIG. 1(a), the position of the feed means 22 is two-dimensionally or three-dimensionally changed, and the position of the bending means 24 is two-dimensionally or three-dimensionally changed. In addition, the angle of installation of the high-temperature area forming mechanism 23 is changed in accordance with changes in the feed direction of the steel tube 25 by the feed means 22. In this manner, as shown in FIG. 1(b), a first bending operation is carried out on the steel tube 25.

Thus, the feed direction on the entrance side of the steel tube 25 (the supply side of the blank) can be freely varied without being limited to the axial direction. Namely, the angle of incidence of the steel tube 25 can be freely varied, and the angle of installation of the high-temperature area forming mechanism 23 is varied in accordance with changes in the angle of incidence of the steel tube. Therefore, it is possible to limit the operating range of the bending means 24 which is supported by the third manipulator.

Next, as shown in FIG. 1(b), the installation position of the high-temperature area forming mechanism 23 is changed to a position closer to the feed means 22, and as shown in FIGS. 1(c) and 1(d), the position of the feed means 22 is two-dimensionally or three-dimensionally varied and the position of the bending means 24 is two-dimensionally or three-dimensionally varied. As a result, a second bending operation is carried out on the steel tube 25.

In this manner, (i) the first manipulator 27 intermittently moves in the axial direction of the first portion of the steel tube 25 and/or moves two-dimensionally or three-dimensionally in a direction which can impart a bending moment to the high-temperature area formed in the steel tube 25, (ii) the third manipulator 28 intermittently moves in the axial direction of the second portion of the steel tube 25 and/or moves two-dimensionally or three-dimensionally in a direction which can impart a bending moment to the high-temperature area, and (iii) the second manipulator 29a continuously or intermittently moves in the axial direction of the high-temperature area of the steel tube 25.

As a result, the installation position of the high-temperature area forming mechanism 23 is changed to a position in the vicinity of the feed means 22, and then the position of the feed means 22, which is supported by the first manipulator 27, is changed to carry out a second bending operation, whereby a bending moment can be imparted to the high-temperature area while moving the high-temperature area in the axial direction of the steel tube 25. As a result, the range of movement of the bending means 24 which is supported by the third manipulator 28 can be reduced.

With this manufacturing apparatus 20, the bending means 24 can be supported by an industrial robot having a third manipulator 28 with a short reach. Therefore, it is possible to increase the compactness of the apparatus, reduce equipment costs, and reduce vibrations at the time of changes in the speed of operation and at the time of movement by reducing as much as possible the speed of operation of the industrial robot. As a result, a bent member 21 having improved dimensional accuracy can be manufactured with high productivity and at a low cost.

When performing bending with the manufacturing apparatus 20, by twisting the steel tube 25 around its axis in the first manipulator 27 and/or twisting the steel tube 25 around its axis in the third manipulator 28, the steel tube 25 can be rotated around its axis and relative twisting rotation can be carried out. As a result, twisting becomes possible, and a product having a twisted portion is obtained, which is desirable.

By simultaneously rotating the steel tube 25 around its axis in the same direction in the first manipulator 27 and the third manipulator 28 at the time of bending, the operating range of the first manipulator 27 and the third manipulator 28 can be reduced, and preferably they can be minimized.

When the second manipulator 29a moves in the axial direction of the steel tube 25 in the direction from the first manipulator 27 towards the third manipulator 28 and the steel tube 25 is twisted around its axis in the first manipulator 27, the second manipulator 29a and the third manipulator 28 are preferably operated in synchrony so that their directions of movement and speeds of movement are the same, in order to improve the dimensional accuracy of the resulting bent member 21.

In this manner, by reducing the overall installation space of the manufacturing apparatus 20 and in particular, by reducing as much as possible the operating range of the gripping means 24 in the invention proposed in Japanese Patent Application No. 2008-276494, it is possible to increase the compactness of the apparatus and to reduce equipment costs, to suppress a change in the operating speed and vibration during operation and shorten the production tact time by reducing as much as possible the operating speed of the gripping means 24. As a result, a bent member 21 having improved dimensional accuracy can be manufactured with high productivity while reducing as much as possible an increase in equipment costs.

Therefore, the present invention can supply a strength member, a reinforcing member, or a structural member of metal having a bent shape for an automobile, for example, with excellent dimensional accuracy and at a low cost.

EXAMPLE 1

The present invention will be described more concretely while referring to examples.

Figure 13:
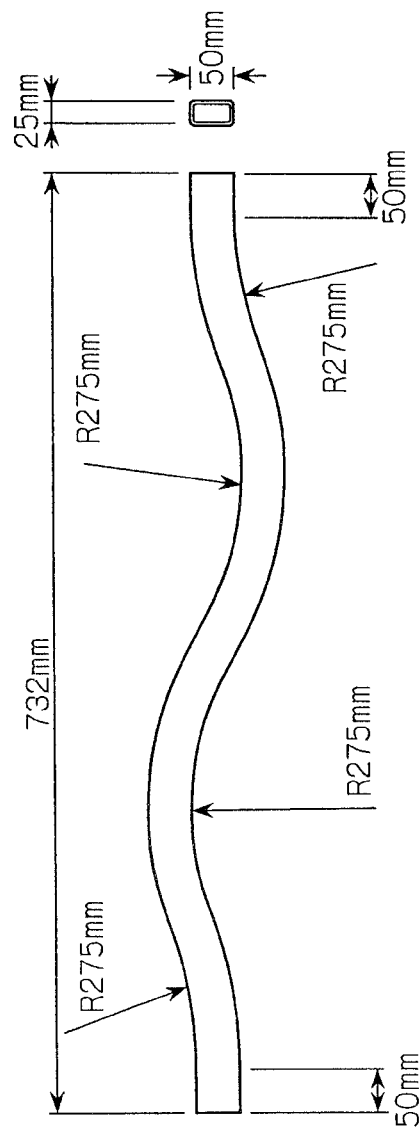
FIG. 13 is an explanatory view showing the shape of a bent member manufactured in Example 1.

Using a manufacturing apparatus 20 according to the present invention as shown in FIG. 1 and an apparatus according to the invention proposed in Japanese Patent Application No. 2008-276494 (comparative example), a part having the shape shown in FIG. 13 was manufactured using a straight rectangular tube (outer dimensions: 50 mm×25 mm, wall thickness of 1.0 mm) as a starting blank material. The feed speed was 80 mm/second and the heating temperature was 930° C. at highest.

In the example of the present invention, the feed means 22 was supported by an articulated industrial robot having a manipulator with 6 axes. The bending means 24 was supported by an articulated industrial robot having a manipulator with 7 axes. The high-temperature area forming mechanism 23 was supported by an articulated industrial robot having a manipulator with 6 axes. Only the installation angle of the high-temperature area forming mechanism 23 was varied in accordance with changes in the feed direction of the feed means 22.

In the apparatus of the comparative example, the feed means on the entrance side was of the type in which a ball screw was driven by a servomotor. Feed operation was carried out only in the axial direction of the rectangular tube, and the installation position of the high-temperature area forming mechanism was fixed. The bending means was supported by an articulated industrial robot having a manipulator with 7 axes.

Figure 14:
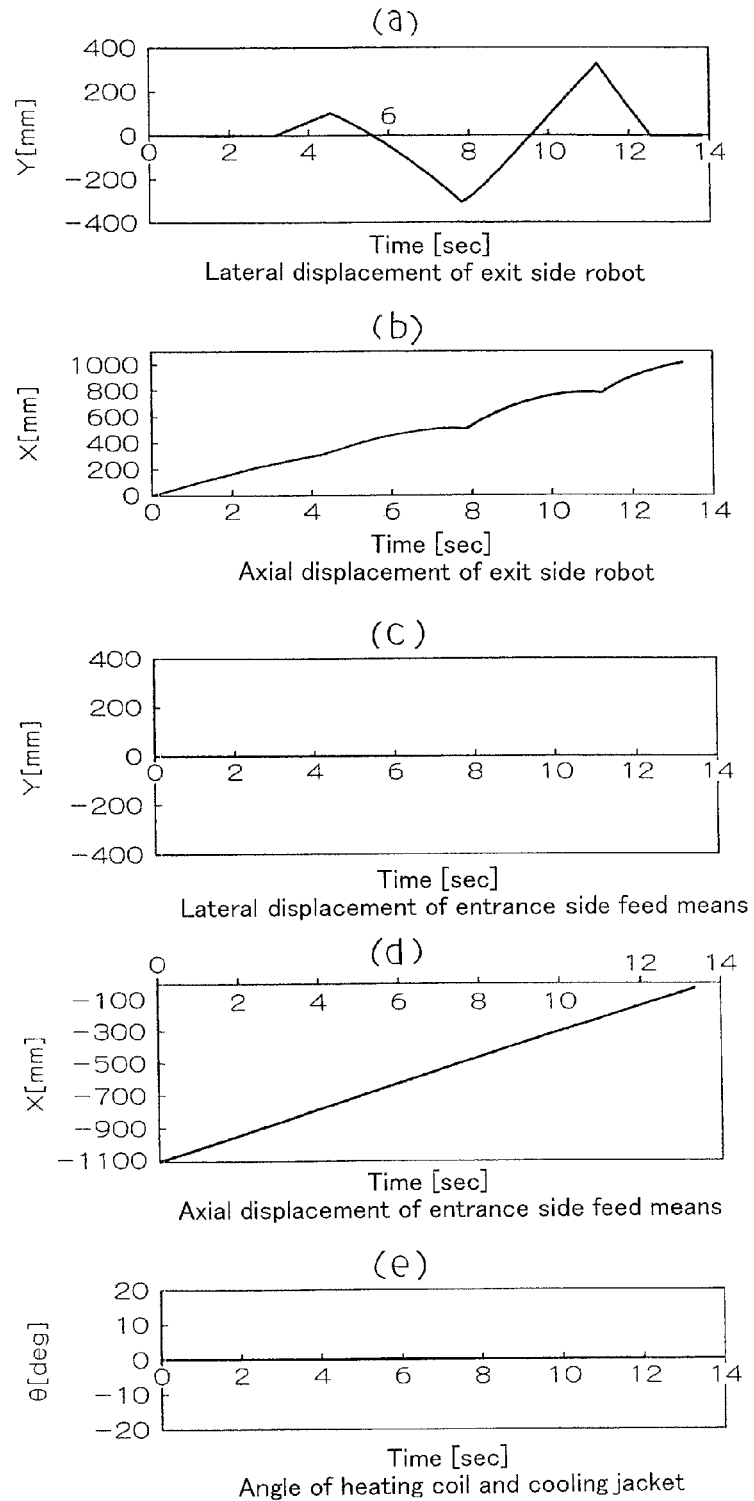
FIG. 14 is a graph showing results of Example 1.
Figure 15:
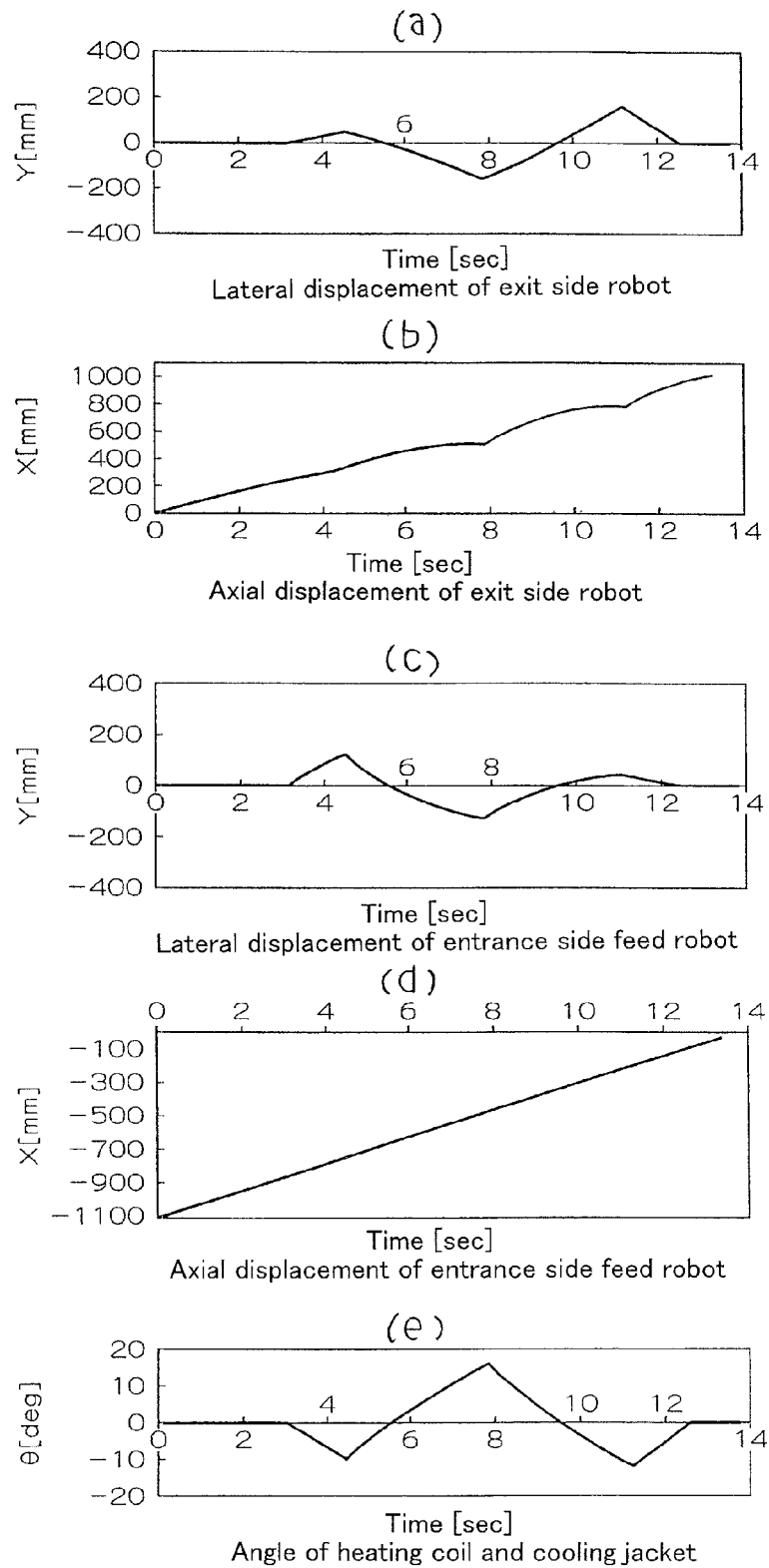
FIG. 15 is a graph showing results of Example 1.
Figure 16:
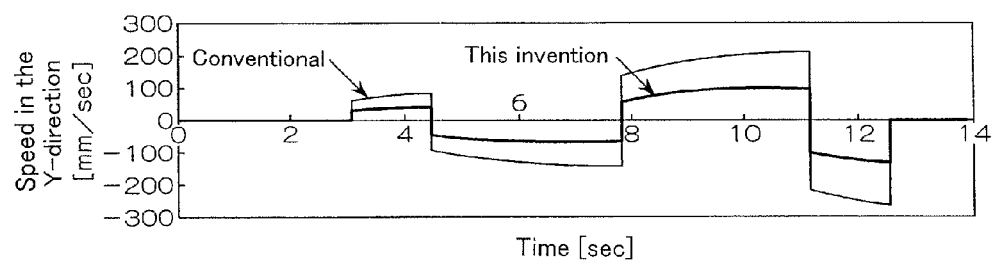
FIG. 16 is a graph showing results of Example 1.
Figure 17:
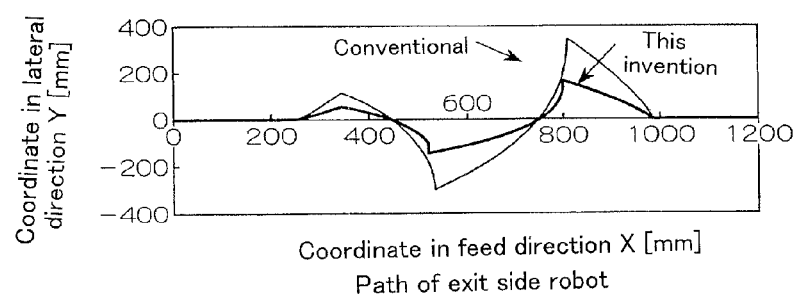
FIG. 17 is a graph showing results of Example 1.

The results of the comparative example are shown by the graph of FIG. 14, the results of the present invention are shown by the graph of FIG. 15, the speeds in the lateral direction of the robots which supported the bending means (the exit side robot) in the example of the present invention and the comparative example are compared in the graph of FIG. 16, and the paths of the robots are compared in the graph of FIG. 17. In the graphs of FIGS. 14-17, the feed direction of the rectangular tube is shown by the X axis and the bending direction perpendicular to the feed direction (the lateral direction) is shown by the Y axis.

From the graphs in FIGS. 14-17, it can be seen that (a) according to the present invention, the operating range of the robot which supported the bending means was reduced to approximately ½, and (b) according to the present invention, the variation in the operating speed of the robot which supported the bending means was reduced to approximately ½, whereby vibrations which have an adverse effect on the accuracy of a product were greatly reduced.

EXAMPLE 2

In this example, vibrations which are generated in a steel tube during bending operation are further reduced compared to Example 1, whereby a bent member having even higher dimensional accuracy is manufactured.

In this example, when carrying out bending of a hollow steel tube having a closed cross section while satisfying above-described Conditions 1-6 according to the present invention to manufacture a bent member, the first manipulator does not move in the axial direction while the third manipulator moves two-dimensionally or three-dimensionally, and/or the third manipulator does not move in the axial direction while the first manipulator moves two-dimensionally or three-dimensionally.

As a result, vibrations which develop in a steel tube during bending due to movement of the first manipulator in the axial direction being obstructed by the third manipulator which moves two-dimensionally or three-dimensionally, or vibrations which develop in a steel tube during bending due to movement of the third manipulator in the axial direction being obstructed by the first manipulator which move two-dimensionally or three-dimensionally are both markedly reduced.

Figure 18:
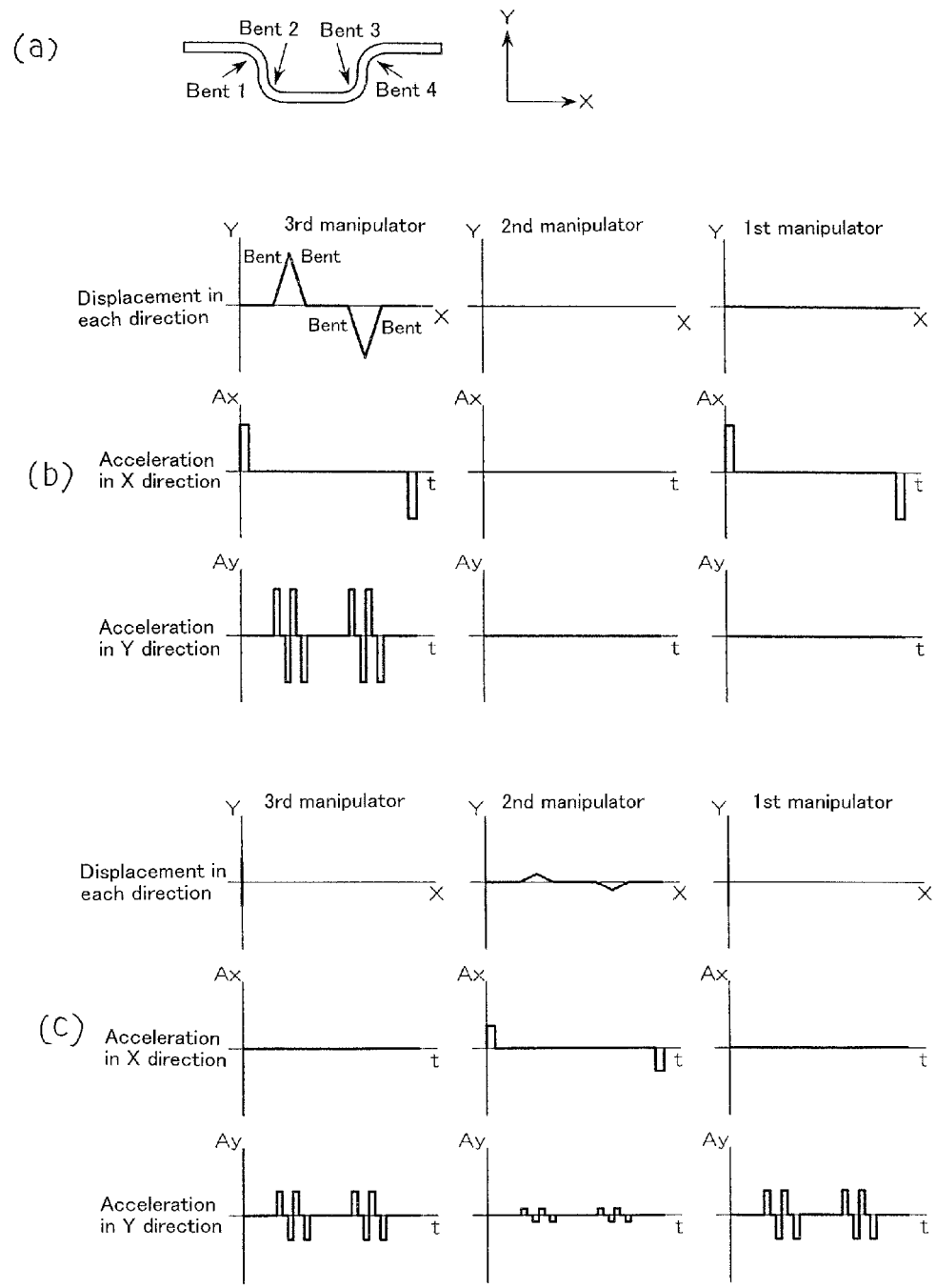
FIG. 18(a) is an explanatory view schematically showing the shape of a bent member manufactured in Example 2.
FIG. 18(b) is a graph showing the displacement and the acceleration in the X direction and the Y direction of the first through third manipulators when a bent member was manufactured while moving only the first manipulator in the axial direction of a steel tube.
FIG. 18(c) is a graph showing the displacement and the acceleration in the X and Y directions of the first through third manipulators when a bent member was manufactured while moving each of the first through third manipulators in the axial direction and the bending direction of a steel tube.
Figure 19:
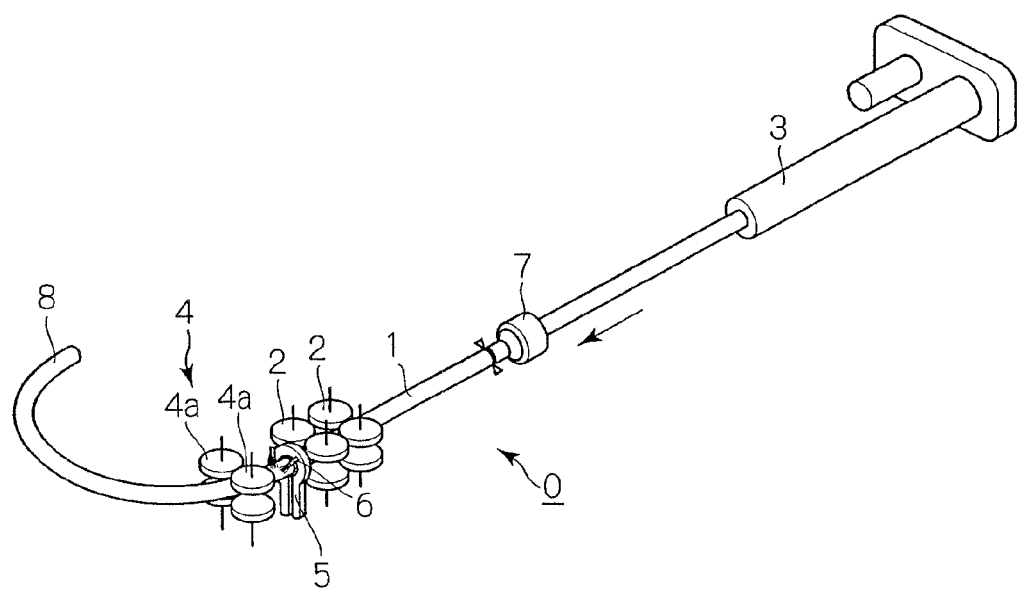
FIG. 19 is an explanatory view schematically showing the structure of a bending apparatus disclosed in Patent Document 1.
Figure 20:
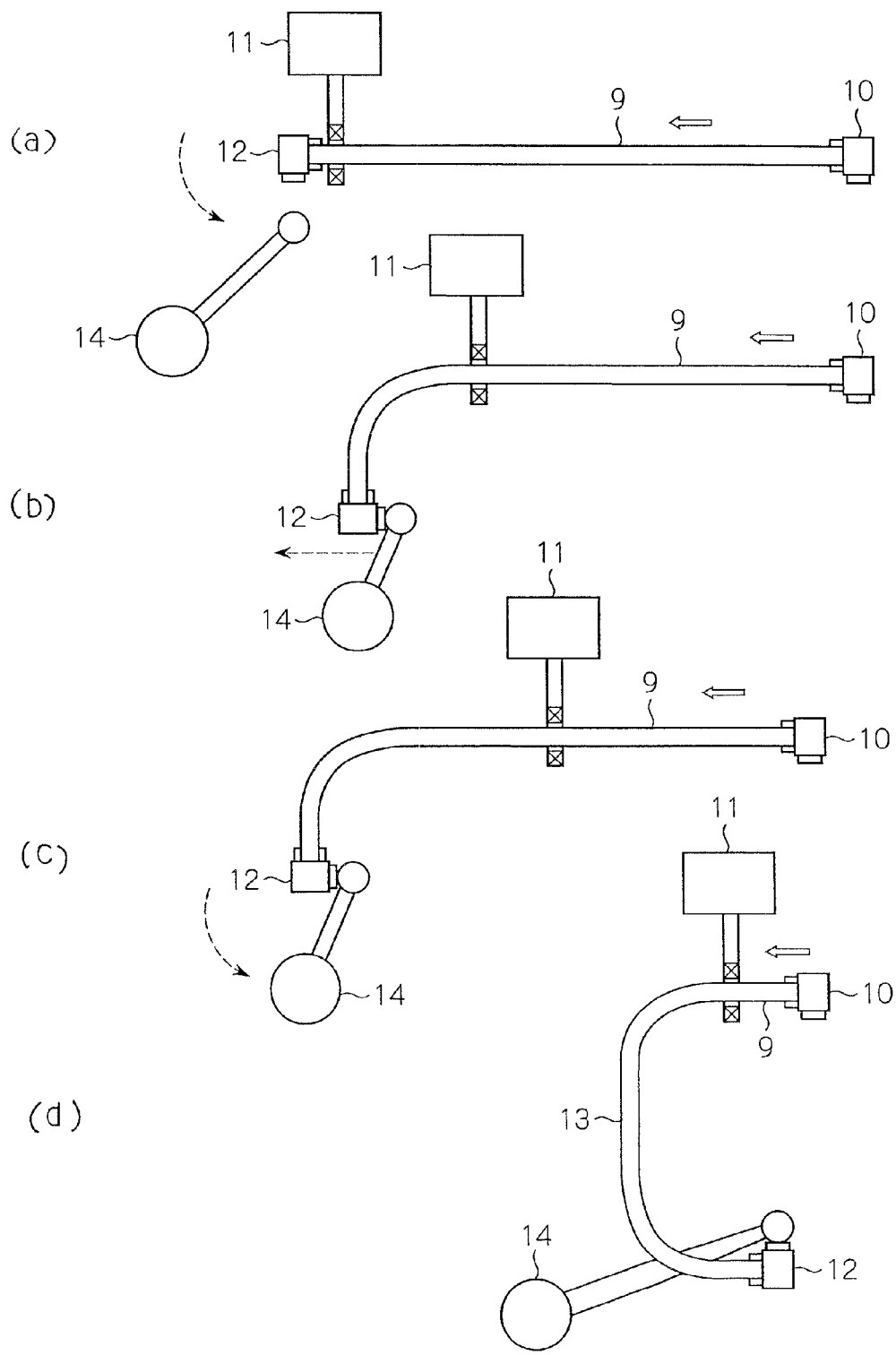
FIGS. 20(a)-20(d) are explanatory views showing the state at various points in time during the manufacture of a bent member by the invention proposed in Japanese Patent Application No. 2008-276494.

FIG. 18(a) is an explanatory view schematically showing the shape of a bent member manufactured by Example 2, FIG. 18(b) is a graph showing the displacements, the acceleration in the X direction, and the acceleration in the Y direction of the first through third manipulators when manufacturing a bent member while moving only the first manipulator in the axial direction of a steel tube, and FIG. 18(c) is a graph showing the displacement, the acceleration in the X direction, and the acceleration in the Y direction of the first through third manipulators when manufacturing a bent member while moving each of the first through third manipulators in the axial direction and the bending direction of a steel tube.

As shown in FIG. 18(b), when manufacturing a bent member while moving only the first manipulator in the axial direction of a steel tube, the movement of the first manipulator in the axial direction is obstructed by the third manipulator which moves two-dimensionally or three-dimensionally. Therefore, vibrations develop in the steel tube undergoing bending, the accelerations of the third manipulator in both the X direction and the Y direction become extremely large, and the dimensional accuracy of the bent member being manufactured decreases.

In contrast, in the example of the present invention, as shown by FIG. 18(c), first, in a state in which a steel tube is held by the first manipulator and the third manipulator, the second manipulator is operated to move the heating and cooling means 23 in the axial direction of the steel tube (the X direction). Then, at the time of bending of bends 1-4, the first manipulator and the third manipulator are simultaneously moved in the bending direction (the Y direction in this case) and a bending moment is imparted to the steel tube. At this time, the second manipulator varies the position and direction of the high-temperature area forming mechanism 23 in accordance with the shape of the steel tube.

In this manner, by moving the high-temperature area forming mechanism 23 in the axial direction of a steel tube without feeding the steel tube held by the first manipulator and the third manipulator in the axial direction, bending is carried out while producing relative movement of the high-temperature area forming mechanism 23 and the steel tube in the axial direction. As a result, the acceleration of the steel tube itself in the X direction becomes substantially zero, and variations in the acceleration in the X direction are reduced and vibrations are decreased when a bending stress is imparted by the first manipulator and/or the third manipulator.

Compared to Example 1, this example eliminates obstruction of the movement of the first manipulator in the axial direction by the third manipulator which moves two-dimensionally or three-dimensionally. Therefore, vibrations of the steel tube at the time of bending are reduced, accelerations in the X direction and the Y direction of the first through third manipulators become extremely small, and the dimensional accuracy of a bent member which is manufactured is increased.

The invention claimed is:

1. A manufacturing method for a bent member characterized by carrying out bending of a hollow metal blank having a closed cross section with satisfying the following conditions 1-6:

Condition 1: a first manipulator grips a first portion of the metal blank located on the side of a first end thereof in a fixed manner;

Condition 2: a second manipulator supports a high-temperature area forming mechanism which heats a region of the metal blank which is located between the first portion and a second portion located on the side of a second end of the metal blank and then performs cooling, thereby forming a high-temperature area in a portion of the region;

Condition 3: a third manipulator grips the second portion of the metal blank;

Condition 4: the first manipulator while fixed to the first portion moves two-dimensionally or three-dimensionally such that a bending moment can be imparted to the high-temperature area;

Condition 5: the third manipulator intermittently moves in the axial direction of the second portion of the metal blank or moves two-dimensionally or three-dimensionally such that a bending moment can be imparted to the high-temperature area; and Condition 6: relative movement of the high-temperature area forming mechanism with respect to the metal blank in its axial direction is produced.

2. A manufacturing method for a bent member as set forth in claim 1 characterized in that the first manipulator operates so as to produce a twisting movement of the metal blank around its axis and/or the third manipulator operates so as to produce a twisting movement of the metal blank around its axis.

3. A manufacturing method for a bent member as set forth in claim 1 characterized in that
the first manipulator continuously moves in the axial direction of the first portion of the metal blank,
the third manipulator does not move in the axial direction of the second portion of the metal blank, and
the high-temperature area forming mechanism changes its angle of installation in accordance with changes in the direction of displacement of the first portion.

4. A manufacturing method for a bent member as set forth in claim 3 characterized in that the installation position of the high-temperature area forming mechanism is moved to a position closer to the first portion.

5. A manufacturing method for a bent member as set forth in claim 1 characterized in that when the third manipulator moves two-dimensionally or three-dimensionally, and/or when the first manipulator moves two-dimensionally and three-dimensionally, the second manipulator moves the high-temperature area forming mechanism in the axial direction of the metal blank.

6. A manufacturing method for a bent member as set forth in claim 1 characterized in that the high-temperature area forming mechanism has a heating means for heating the metal blank and a cooling means for forming a high-temperature area by cooling the metal blank which was heated by this heating means.

7. A manufacturing method for a bent member as set forth in claim 6 characterized in that the first manipulator is disposed at a first position, the heating means is disposed at a second position downstream of the first position in the axial direction of the metal blank, the cooling means is disposed at a third position downstream of the second position in the axial direction of the metal blank, and the third manipulator is disposed at a fourth position downstream of the third position in the axial direction of the metal blank.

8. A manufacturing apparatus for a bent member, comprising a first manipulator, a second manipulator, and a third manipulator as described below and being capable of manufacturing a bent member by performing bending on a hollow metal blank having a closed cross section so as to satisfy the following Conditions 1 to 3:
the first manipulator: gripping a first portion of a metal blank located on the side of a first end thereof in a fixed manner;
the second manipulator: supporting a high-temperature area forming mechanism which heats a region of the metal blank which is located between the first portion and a second portion located on the side of a second end of the metal blank and then performs cooling, thereby forming a high-temperature area in a portion of the region;
the third manipulator: gripping the second portion of the metal blank;
Condition 1: the first manipulator while fixed to the first portion moves two-dimensionally or three-dimensionally such that a bending moment can be imparted to the high-temperature area;
Condition 2: the third manipulator intermittently moves in the axial direction of the second portion of the metal blank or moves two-dimensionally or three-dimensionally such that a bending moment can be imparted to the high-temperature area; and
Condition 3: relative movement of the high-temperature area forming mechanism with respect to the metal blank in its axial direction is produced.

9. A manufacturing apparatus for a bent member from a metal blank comprising:
a feed means which is disposed at a first position so as to be able to move two-dimensionally or three-dimensionally and which can feed a hollow metal blank having a closed cross section while changing a feed direction,
a heating means which is positioned at a second position downstream of the first position in the feed direction of the metal blank and which heats all or a portion of the circumference of the metal blank being fed,
a cooling means which is disposed at a third position downstream of the second position in the feed direction of the metal blank and which cools the portion of the metal blank being fed which was heated by the heating means, and
a bending means which is disposed at a fourth position downstream of the third position in the feed direction of the metal blank so as to be able to move two-dimensionally or three-dimensionally and which together with the feed means imparts a bending moment to the heated portion of the metal blank by gripping at least one location of the metal blank being fed and thereby bends the metal blank into a desired shape,
characterized in that the heating means has a function that an angle of installation thereof can be changed in accordance with changes in the feed direction of the metal blank by the feed means.

10. A manufacturing apparatus for a bent member as set forth in claim 9 characterized in that the heating means and the cooling means have the function that their installation positions can be changed to positions closer to the position of the feed means.

11. A manufacturing apparatus for a bent member as set forth in claim 10 characterized in that the feed means is supported by a first manipulator, the heating means and the cooling means are supported by a second manipulator, and the bending means is supported by a third manipulator.

12. A manufacturing apparatus for a bent member as set forth in claim 11 characterized in that the first manipulator is a manipulator of a vertically articulated first industrial robot, the second manipulator is a manipulator of a vertically articulated second industrial robot, and the third manipulator is a manipulator of a vertically articulated third industrial robot.

13. A manufacturing apparatus for a bent member as set forth in claim 11 characterized in that the first manipulator and the third manipulator are manipulators of a dual-arm first industrial robot and the second manipulator is a manipulator of a vertically articulated second industrial robot.

14. A manufacturing apparatus for a bent member as set forth in claim 11 further characterized in that the third manipulator supports a metal blank which underwent bending in order to suppress a decrease in the dimensional accuracy of the metal blank.

15. A manufacturing apparatus for a bent member as set forth in claim 11 further characterized in that a fourth manipulator is provided to support a metal blank which underwent bending and thereby suppress a decrease in the dimensional accuracy of the metal blank.

16. A manufacturing apparatus for a bent member as set forth in claim 15 characterized in that the fourth manipulator is a manipulator of a vertically articulated fourth industrial robot.

17. A manufacturing apparatus for a bent member as set forth in claim 12 characterized in that the vertically articulated industrial robots have at least five axes.

18. A manufacturing apparatus for a bent member as set forth in any claim 9 characterized in that a support means which guides the metal blank to the heating means is provided on the entrance side of the heating means.

* * * * *